US011734689B2

(12) United States Patent
Buch

(10) Patent No.: US 11,734,689 B2
(45) Date of Patent: Aug. 22, 2023

(54) METHODS FOR IMPROVING IDENTIFICATION THREAT PROTECTION AND DEVICES THEREOF

(71) Applicant: JPMorgan Chase Bank, N.A., New York, NY (US)

(72) Inventor: Amit M. Buch, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 285 days.

(21) Appl. No.: 16/215,156

(22) Filed: Dec. 10, 2018

(65) Prior Publication Data

US 2019/0180284 A1     Jun. 13, 2019

Related U.S. Application Data

(60) Provisional application No. 62/597,274, filed on Dec. 11, 2017.

(51) Int. Cl.
   *G06Q 20/40*     (2012.01)
   *G06Q 20/42*     (2012.01)
   (Continued)

(52) U.S. Cl.
   CPC ... *G06Q 20/40145* (2013.01); *G06Q 20/3224* (2013.01); *G06Q 20/382* (2013.01);
   (Continued)

(58) Field of Classification Search
   CPC ........... G06Q 20/40145; G06Q 20/405; G06Q 20/42; G06Q 20/3224; G06Q 20/382;
   (Continued)

(56) References Cited

U.S. PATENT DOCUMENTS 9,547,763 B1 *   1/2017   Avital ................ H04L 63/0861
9,818,116 B2 *   11/2017   Caldera ................. G06Q 20/34
(Continued)

OTHER PUBLICATIONS

Satoshi Nakamoto, "Bitcoin: A Peer-to-Peer Electronic Cash System", Satoshi Nakamoto Institute (Oct. 31, 2008), available at http://nakamotoinstitute.org/bitcoin/.
(Continued)

*Primary Examiner* — Christine M Behncke
*Assistant Examiner* — Henry H Jung
(74) *Attorney, Agent, or Firm* — Greenblum & Bernstein, P.L.C.

(57) ABSTRACT

Various methods, apparatuses, and media for approving a first transaction related to identification information of an individual are provided. A second transaction to provide approval of the first transaction is received after the first transaction is authenticated. Secondary identification information of the individual is obtained in response to the second transaction being received, and an electronic device is identified based on the secondary identification information. A predetermined process for approving the first transaction is determined. Communication is initiated with the electronic device according to the predetermined process. The approval is provided in response to the predetermined process being completed, with the approval approving execution of the first transaction related to the identification information.

20 Claims, 7 Drawing Sheets

(51) Int. Cl.
*G06Q 20/32* (2012.01)
*H04L 9/06* (2006.01)
*G06Q 20/38* (2012.01)
*H04L 9/32* (2006.01)
*G06V 40/16* (2022.01)
*H04L 9/00* (2022.01)

(52) U.S. Cl.
CPC ........... *G06Q 20/405* (2013.01); *G06Q 20/42* (2013.01); *G06V 40/172* (2022.01); *H04L 9/0637* (2013.01); *H04L 9/3239* (2013.01); *H04L 9/3297* (2013.01); *H04L 9/50* (2022.05)

(58) Field of Classification Search
CPC  G06Q 20/4014; G06Q 20/401; H04L 9/3239; H04L 9/3297; H04L 9/0637; H04L 2209/38; H04L 9/32; G06K 9/00288
USPC ................. 726/7; 705/2, 44, 72, 75; 713/169
See application file for complete search history.

(56) References Cited

U.S. PATENT DOCUMENTS

| | | | | |
|---|---|---|---|---|
| 10,484,178 | B2 * | 11/2019 | Andrade | H04L 63/105 |
| 2013/0167211 | A1 * | 6/2013 | Kamat | H04L 63/20 |
| | | | | 726/7 |
| 2014/0289833 | A1 * | 9/2014 | Briceno | H04L 63/08 |
| | | | | 726/5 |
| 2016/0021111 | A1 * | 1/2016 | Zhai | H04L 63/0876 |
| | | | | 713/173 |
| 2018/0060496 | A1 * | 3/2018 | Bulleit | G16H 40/63 |
| 2018/0260542 | A1 * | 9/2018 | Larvol | G06F 21/577 |
| 2018/0308099 | A1 * | 10/2018 | Binns | G06Q 20/4016 |
| 2019/0182042 | A1 * | 6/2019 | Ebrahimi | H04L 9/3236 |
| 2019/0205889 | A1 * | 7/2019 | Cantrell | H04L 9/3236 |
| 2020/0034807 | A1 * | 1/2020 | Shamai | G06Q 20/325 |

OTHER PUBLICATIONS

"What is Blockchain Technology? A Step-by-Step Guide for Beginners", updated Mar. 1, 2019, available at https://blockgeeks.com/guides/what-is-blockchain-technology/.

Robert Hackett, "Why J.P. Morgan Chase is Building a Blockchain on Ethereum", Fortune (Oct. 4, 2016), available at http://fortune.com/2016/10/04/jp-morgan-chase-blockchain-ethereum-quorum/.

Freeman et al., "Bossie Awards 2017: The best software development tools", InfoWorld (Sep. 27, 2017), available at https://www.infoworld.com/article/3228131/bossie-awards-2017-the-best-software-development-tools.html#slide2.

* cited by examiner

METHODS FOR IMPROVING IDENTIFICATION THREAT PROTECTION AND DEVICES THEREOF

CROSS-REFERENCE TO RELATED APPLICATION

This application claims the benefit of U.S. Provisional Patent Application Ser. No. 62/597,274, filed Dec. 11, 2017, which is hereby incorporated by reference in its entirety.

BACKGROUND

1. Field of the Disclosure

This technology generally relates to identity verification, and, more particularly, to methods apparatuses, systems, and media for approving a transaction related to identification information of an individual.

2. Background Information

Identity theft is the deliberate use of personally identifiable information associated with someone else to illegally gain a financial, or other, advantage, such as to obtain credit and/or other benefits. Unfortunately, identity theft is on the rise including at various entities which obtain and store confidential information. Currently, mechanisms to protect these entities from identity theft are insufficient in view of the growing threat.

For example, a recent breach at a recognized credit bureau put a target on nearly half of the U.S. population. The institutions that have seemingly assumed the guardianship of our most precious personally identifiable information are failing to protect it.

SUMMARY

The present disclosure, through one or more of its various aspects, embodiments, and/or specific features or sub-components, provides, inter alia, various systems, servers, devices, methods, media, programs, and platforms for confirming a transaction regarding an individual and improving identity theft protection. The various aspects, embodiments, features, and/or sub-components provide a technology solution that is technically easy to implement, provides extreme security with full, or at least part, control and transparency to the ultimate owner or guardian of the personally identifiable information.

According to an embodiment of the present disclosure, a method for approving a first transaction is provided. The first transaction is related to identification information of an individual, and the identification information is stored in a memory. A second transaction to provide approval of the first transaction related to the identification information is received, with the second transaction being received after the first transaction related to the identification information is authenticated. Secondary identification information of the individual is obtained in response to the second transaction being received. An electronic device is identified based on the secondary identification information of the individual. A processor determines a predetermined process for approving the first transaction related to the identification information. Communication with the electronic device is initiated according to the predetermined process. The approval is provided in response to the predetermined process being completed, with the approval approving execution of the first transaction related to the identification information.

According to another aspect of the present disclosure, the predetermined process includes a timeout period. In this regard, the approval that approves execution of the first transaction related to the identification information is provided in response to the predetermined process being completed before expiration of the timeout period.

According to yet another aspect of the present disclosure, the secondary identification information is stored in a second memory different than the memory in which the identification information is stored.

According to a further aspect of the present disclosure, the memory, in which the identification information is stored, comprises a block storage. The second transaction to provide the approval of the first transaction related to the identification information is received from an entity that manages the block storage. The approval is provided to the entity, and the entity executes the first transaction related to the identification information in response to the approval.

According to still a further another aspect of the present disclosure, the identification information of the individual is stored in a record of the block storage and includes static identification information, and the secondary identification information of the individual includes dynamic identification information.

According to another aspect of the present disclosure, the secondary identification information is obtained from the identification information to which the first transaction relates.

According to yet another aspect of the present disclosure, the identification information is received from the memory after the first transaction related to the identification information is authenticated, and the first transaction related to the identification information is executed on the identification information stored in the memory.

According to a further aspect of the present disclosure, the secondary identification information of the individual includes an identifier associated with the electronic device, and the electronic device includes a processor and a memory. The predetermined process transmits a message to the electronic device during the communication with the electronic device, receives an affirmative reply from the electronic device in response to the message.

According to still a further another aspect of the present disclosure, the predetermined process includes a condition that the first transaction related to the identification information of the individual is not initiated from at least one predetermined region.

According to another aspect of the present disclosure, the predetermined process includes a condition that the individual of the first transaction related to the identification information is not identified in a data breach.

According to yet another aspect of the present disclosure, the predetermined process for approving the first transaction related to the identification information of the individual is determined from a plurality of predetermined processes.

According to a further aspect of the present disclosure, a first predetermined process is selected from the plurality of predetermined processes in response to the secondary identification information of the individual being changed within a predetermined time period, and a second predetermined process is selected from the plurality of predetermined process in response to the secondary identification information of the individual not being changed within the predetermined time period. In this regard, the second predetermined process is different than the first predetermined process.

According to still a further another aspect of the present disclosure, a first predetermined process is selected from the plurality of predetermined processes in response to the first transaction being initiated from at least one predetermined region or the individual being identified in a data breach, and a second predetermined process is selected from the plurality of predetermined processes in response to the first transaction not being initiated from the at least one predetermined region and the individual not being identified in the data breach. In this regard, the second predetermined process is different than the first predetermined process.

According to another aspect of the present disclosure, a first predetermined process is selected from the plurality of predetermined processes in response to a first piece of the secondary identification information of the individual corresponding to a second piece of the secondary identification information of the individual, and a second predetermined process is selected from the plurality of predetermined processes in response to the first piece of the secondary identification information of the individual not correlating to the second piece of the secondary identification information of the individual. In this regard, the second predetermined process is different than the first predetermined process.

According to yet another aspect of the present disclosure, the first piece of the secondary identification information of the individual includes an identifier for the electronic device. The second piece of the secondary identification information of the individual includes an address of the individual. The first piece of the secondary identification information is determined to correspond to the second piece of the secondary identification information in response to a location of the electronic device being within a predetermined distance of the address of the individual.

According to a further aspect of the present disclosure, the secondary identification information of the individual includes an identifier for the electronic device and an address of the individual. The communication with the electronic device determines a location of the electronic device, and the predetermined process includes a condition that the location of the electronic device is within a predetermined distance of the address of the individual.

According to still a further another aspect of the present disclosure, the secondary identification information of the individual includes an identifier for the electronic device, the communication with the electronic device includes accessing a camera of the electronic device, and the predetermined process includes a condition that the individual is identified with the camera of the electronic device using a facial recognition process.

According to another aspect of the present disclosure, the secondary identification information of the individual includes an identifier for the electronic device, the communication with the electronic device obtains biometric data stored by the electronic device, and the predetermined process includes a condition that the biometric data stored by the electronic device matches data in the secondary identification information of the individual.

According to another embodiment of the present disclosure, a system for approving a first transaction is provided. The first transaction is related to identification information of an individual, and the identification information is stored in a memory. The system includes a processor and a memory storing instructions. The instructions, when executed by the processor, cause the processor to perform operations including: receiving a second transaction to provide approval of the first transaction related to the identification information, with the second transaction being received after the first transaction related to the identification information is authenticated; obtaining secondary identification information of the individual in response to the second transaction being received; identifying, based on the secondary identification information of the individual, an electronic device; determining a predetermined process for approving the first transaction related to the identification information; initiating communication with the electronic device according to the predetermined process; and providing the approval in response to the predetermined process being completed, with the approval approving execution of the first transaction related to the identification information.

According to a further embodiment of the present disclosure, a non-transitory computer-readable medium including an executable computer program for approving a first transaction is provided. The first transaction is related to identification information of an individual, and the identification information is stored in a memory. The executable computer program, when executed by a processor, causes the processor to perform operations comprising: receiving a second transaction to provide approval of the first transaction related to the identification information, with the second transaction being received after the first transaction related to the identification information is authenticated; obtaining secondary identification information of the individual in response to the second transaction being received; identifying, based on the secondary identification information of the individual, an electronic device; determining a predetermined process for approving the first transaction related to the identification information; initiating communication with the electronic device according to the predetermined process; and providing the approval in response to the predetermined process being completed, with the approval approving execution of the first transaction related to the identification information.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

Figure 1:
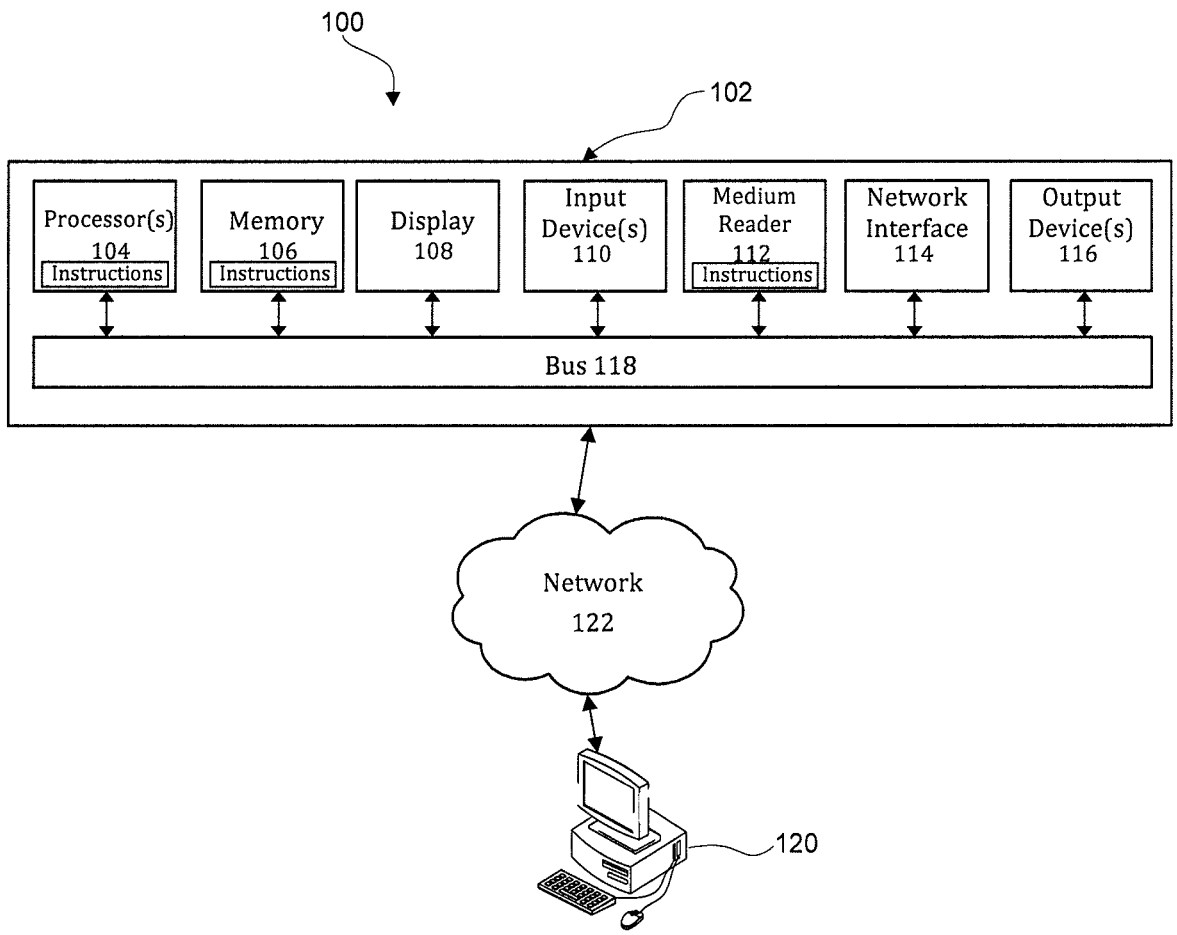
FIG. 1 illustrates an exemplary computer system for approving a transaction, related to identification information of an individual, in a network environment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth®, Zigbee®, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, a security camera, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limiting embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
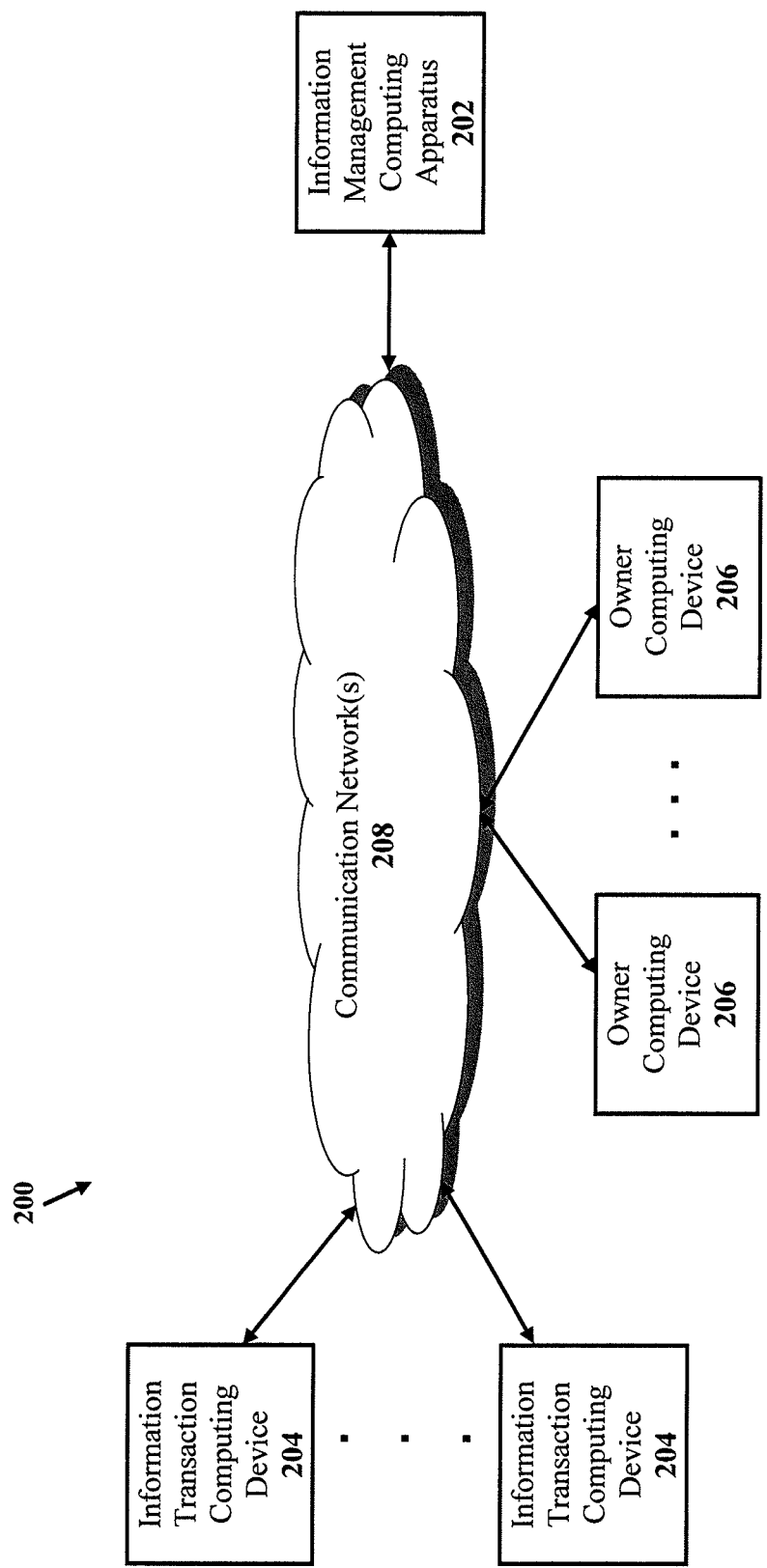
FIG. 2 illustrates an exemplary network environment for approving a transaction related to identification information of an individual.

Referring to FIG. 2, a schematic of a system 200, deployed in an exemplary network environment, for approving a transaction related to identification information of an individual is generally shown. As will be discussed in detail in the following descriptions, the identification information of the individual may be stored in a memory. While certain entities may be allowed to access the memory to read or otherwise modify such identification information, the present disclosure implements procedural safeguards for the individual to prevent unfettered access to such identification information. In this regard, the system 200 provides, among other non-limiting and advantageous effects, improved identity theft protection by controlling access to the identification information.

In embodiments of the present application, the identify theft and the other non-limiting and advantageous effects may be described as being implemented and improved via two components. The two components correspond to two workflows that govern the lifecycle of a transaction, record, smart contract, or other information contract or proxy. The two workflows may be executed in parallel or serially. The system 200 and other embodiments described herein may execute any one or both of the workflows, or any portion of any one or both of the workflows. The first workflow generally relates to the creation and storage of identification information of the individual. The second workflow generally relates to the management of such identification information.

Figure 3:
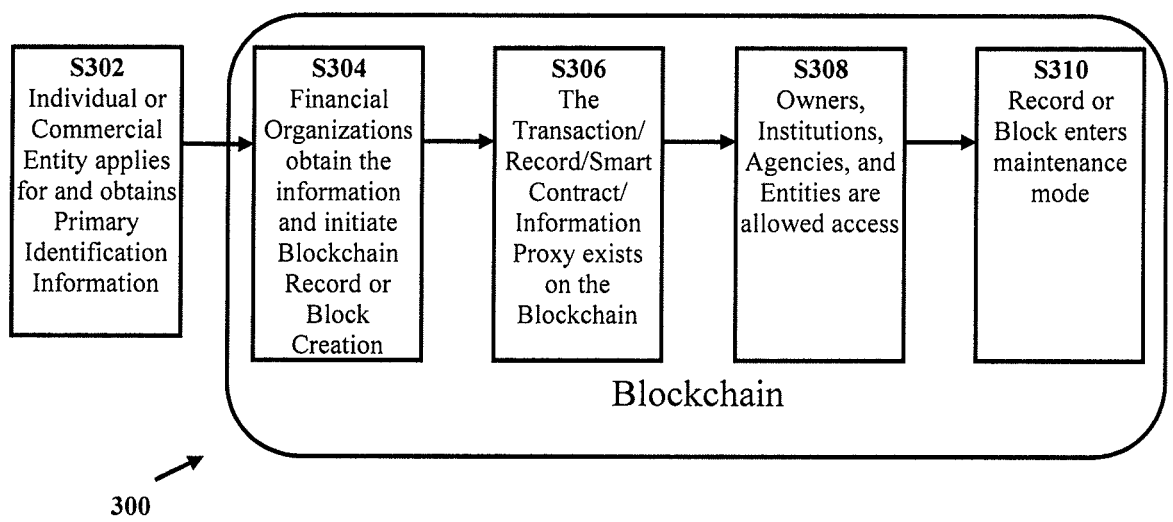
FIG. 3 illustrates an exemplary workflow of a process for creating and storing identification information of an individual.

The first workflow is generally shown in FIG. 3 at 300. As discussed above, the first workflow 300 generally relates to the creation and storage of identification information of the individual. The identification information of the individual may be stored in a memory. The memory may be, for example, an electronic or digital ledger, a database, or block storage. The block storage may include, for example, the Blockchain. Nevertheless, it is to be known and understood that additional memories and/or storages may be used without departing from the scope of the present application. The memory may be, for example, the same or similar to the computer memory 106 as described with respect to FIG. 1.

The identification information may comprise personally identifiable information, confidential information related to the individual, confidential information related to a smart contract, or any other information which may relate to the individual. The identification information is generally described as being included within the memory such that it includes primary identification information and additional identification information. Nevertheless, it should be understood that the nature of the information and the manner in which it is stored, as described in the examples herein, are not to be limiting. Any types of information and manners of storage may be implemented by the various embodiments described herein without departing from the scope of the present disclosure.

Also, while the information is described as relating to an identification individual, the identification information may additionally or alternately relate to a business, commercial, or other entity. The individual may indeed be any entity as described herein without departing from the scope of the present disclosure. Accordingly, while the identification information is generally described herein as relating to an individual for convenience, it may also relate to an entity. The entity may be interchangeable with individual herein, and vice versa.

Primary identification information of the individual may be applied for at S302 of the first workflow 300. The primary identification information may include any combination of a social security number (SSN), a taxpayer identification number (TIN), an employment identification number (EIN), a birth date, a name, or any other personally identifiable and/or confidential information. The primary identification information may include information which is issued by a local, national, regional, state, federal, or other government or government-sponsored agency. The primary identification information may be unique to the individual. The primary identification information may also be static. In this regard, the primary identification information may be completely and permanently static, or the primary identification information may be mostly static while only being changeable through a process with the local, national, regional, state, federal, or other government or government-sponsored agency which issues the primary identification information. In any event, the primary identification information comprises information for identifying the individual and may include any types of information discussed above in the immediate paragraph, and additional or alternative types of information discussed throughout the present disclosure, as well as any additional types of information which are known and understood. The above-described examples are merely exemplary and are not limiting or exhaustive.

The primary identification information is issued, obtained, or assigned by an agency or other entity at S304 of the first workflow 300. The term entity as used herein is meant to be all encompassing and should not be limiting. It may include any individual, private, public, government, or other body including, but not limited to, all of the bodies and entities descried herein.

A process for creating a record or block of the primary identification information may be initiated by the agency or other entity at S304 of the first workflow 300. The agency or other entity may be the local, national, regional, state, federal, or other government or government-sponsored agency to which the application for the primary identifying information is made, or additional or alternative agencies or entities. In the embodiment of FIG. 3, the agency or other entity is shown as being a financial organization. Nevertheless, it is to again be known and understood that additional and/or alternative entities and/or agencies may obtain the primary identification information and initiate creation of the record of the primary identification information.

The record or block of the primary identification information is created in the memory, or recorded in the block storage, at S306 of FIG. 3. The record or block may comprise a fact, smart contract, transaction, information proxy, or any other known ledger, database, memory, or block storage entry. The information proxy may, for example, act as an information exchange. Of course, any additional types of contracts or entries may be included within the record without departing from the scope of the present application. Also, the term record is mainly used herein and describes any known and understand entry in a ledger, database, memory, or block storage. It may be, for example, a block in a block storage. The term block and other similar storage entry formats may be exchanged for record herein without departing from the scope of the present disclosure. In the instant example, the record which records the primary identification information may be described as a master record for convenience. The master record may be computationally cheap to create with the creation process being governed by defined standards.

Additional identification information may be attached to the master record. The additional identification information may be provided during the application for the primary identification information at S302 and attached to the master record during the creation or recordation at S306. Additionally and/or alternatively, the additional identification information may be provided and attached independently of the first workflow 300. The additional identification information may include a driver's license number, a state identification (ID) number, a phone number, a residential address, a court filing or ruling, biometric information, lines of credit, or any additional information which may identify or otherwise be associated with the individual for which the master record is created. The additional identification information may comprise dynamic information, or information which is more easily changeable and/or less secure than the primary identification information. Those skilled in the art will appreciate that the additional identification information is not limited to those types of information described herein and that additional and/or alternative types of additional identification information may be used without departing from the scope of the present disclosure.

After creation, various institutions, government agencies, law enforcement agencies, trustees, and other entities are allowed to access the record at S308 of the first workflow 300. The owner or individual to which the record relates may also access the record at S308. While the record is described as relating to or owned by the individual, it is to be understood that the record need not necessarily relate to or be owned by the individual. The individual may be, for example, a trustee, guardian, agent, or executor of an individual or entity to which to which the information relates. The individual may further have any predefined relationship or association with the individual or entity to which to which the information relates as generally understood in the art.

The memory or block storage, identified as the Blockchain in FIG. 3, may be a public, private, or hybrid consortium. Any combination of entities may be allowed access at S308 without departing from the scope of the present disclosure, as generally described above. For convenience, such combinations are referred to hereinafter as institutions. Nevertheless, it is to be known and understood that this term is not meant to be limiting.

The institutions are allowed access to the memory or block storage at S308 such that they may make transactions regarding the master record, or the attachments thereto. The transactions may comprise mere access to the primary identification information of the master record or to the additional identification information of the attachments to the master record. Additionally or alternatively, the transactions may comprise additions to, removal from, and/or modifications of the primary identification information of the master record and/or the additional identification information of the attachments to the master record. Further, in additional embodiments, the transactions may be limited to read-only access for the primary identification information of the master record, while allowing for additions, deletions, modifications, and other read/write privileges for the additional identification information of the attachments to the master record. In this regard, any combinations of same or different permissions may be allowed for the master record and the attachments thereto. Further, different permissions may be provided for different institutions.

When access is allowed at S308 of the first workflow 300, the master record for which access is allowed enters a maintenance mode at S310, in which the record is created.

Figure 4:
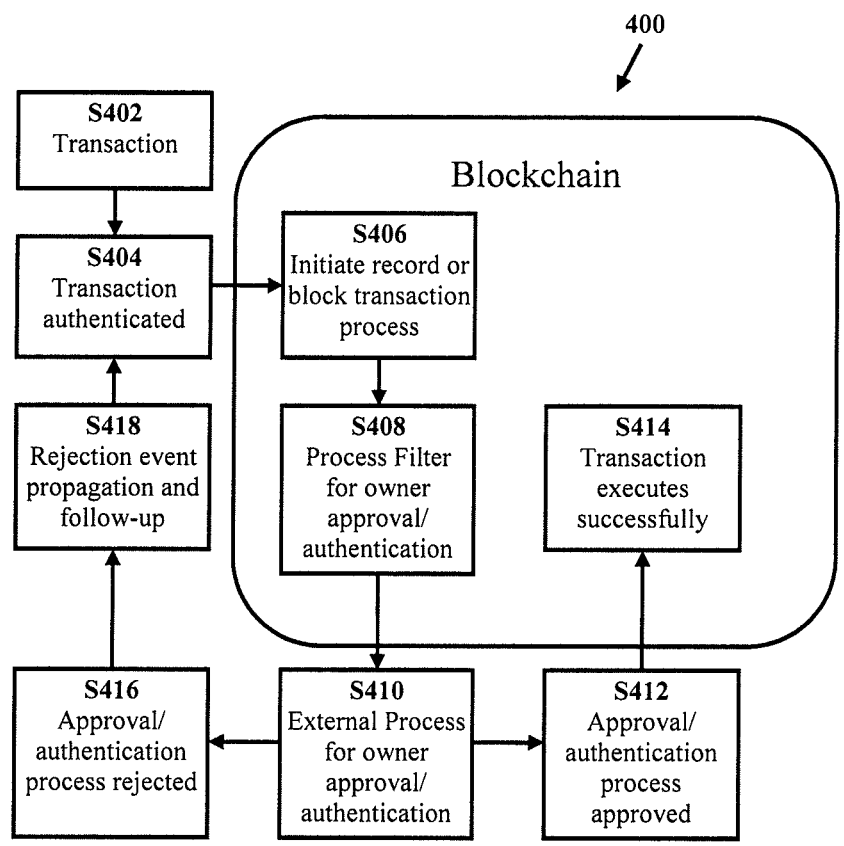
FIG. 4 illustrates an exemplary workflow of a process for managing identification information of an individual.

The second workflow is generally shown in FIG. 4 at 400. As discussed above, the second workflow 400 generally relates to the management of the identification information of the individual, as included in the master record and the attachments.

A transaction regarding the identification information of the individual may be made at S402 of the second workflow 400. The inquiry may be made by, for example, one of the institutions as described with respect to the first workflow 300. Also, as further discussed with respect to the first workflow 300, the transaction may include any attempt to access, add, delete, or otherwise modify the primary identification information of the master record and/or the additional identification information in the attachments to the master record. As for specific examples, the transaction may include a credit inquiry, a request to open a new line of credit, any transaction involving credit, an identity verification process, a smart contract, or any other process in which an identity of an individual is requested to be read, confirmed, or otherwise modified. Those skilled in the art appreciate, however, that the above-described examples are merely exemplary and are not limiting or exhaustive. The aspects of the present application may be used in any additional transactions and/or processes as is apparent from the disclosure contained herein.

The transaction and/or the institution making the transaction may be authenticated at S404 of the second workflow 400. In embodiments of the present disclosure, both the institution and the nature of the transaction are required to be authenticated at S404. That is, the institution may be authenticated, and it may be further determined whether the institution holds sufficient permissions to perform the requested transaction. Nevertheless, in further embodiments of the present disclosure, the nature and manner of making the authentication may be performed in accordance with any known and understood methods without departing from the scope of the present disclosure.

Upon authentication at S404, a process for managing the record in the memory or the block storage is initiated at S406. The process for managing the record is conducted after the transaction related to the identification information is authenticated. The process for managing the record may be initiated by, for example, retrieving the record from the memory or the block storage. The process for managing the record may further be initiated in accordance with any additional or alternative procedures which are known and understood.

After the process is initiated at S406, it is determined whether the record for which the transaction is made includes a process filter for owner authentication and/or approval of the transaction at S408. The process filter which requires owner authentication and/or approval of the transaction may be absolute and apply to all transactions regardless of nature. Alternatively, the process filter for authentication and/or approval of the transaction may be selective and apply to only transactions from certain institutions. For example, the process filter may only apply to transactions from private institutions and may not apply to transactions from public and/or government institutions. The process filter may also be selective with respect to the nature of the transaction. For example, the process filter may depend upon whether the transaction is for the primary identification information of the master record or the additional identification information included in the attachments to the master record. In different embodiments, the process filter may only be required for transactions to the primary identification information of the master record or only required for transactions to the additional identification information included in the attachments. In additional or alternative examples, the process filter may depend on whether the transaction is for access to the primary identification information and/or the additional identification information, or whether the transaction is for addition, deletion, or other modification to the primary identification information and/or the additional identification information. In even further embodiments, the process filter may be required for only additions to the primary identification information and/or the additional identification information. In such embodiments, the individual regarding the transaction may be required to authenticate or approve any new lines of credit which are to be added to his or her record, thereby thwarting a main goal of identity theft. Of course, the above-described examples are neither limiting nor exhaustive. The process filter may be applied to any type of institution and/or any type of transaction in any manner without departing from the scope of the present disclosure.

The process filter for requiring authentication or approval of the transaction may be set by the individual and/or by any of the entities described herein, including the entities which obtain the information for and initiate the record at S304 of the first workflow 300 and the institutions and entities which are described as including access to the memory or block storage at S308 of the first workflow 300. The process filter may further be set by the entity which performs the external approval/authentication process with the individual to which the transaction corresponds, with such external approval/authentication process being described below with respect to S410 of the second workflow 400. According to such embodiment, the individual may contract with or otherwise allow such entity to monitor and manage his or her confidential information. As a result, the public may be able to individually and selectively determine whether to perform the external approval/authentication process and to what extent. Again, these examples are merely exemplary and the filter or condition may be set in accordance with and by any additional known and understood methods.

The process filter is described above in singular form. Nevertheless, it is to be known and understood that plural filters or conditions may be provided for in the process filter at S408. In such embodiments, for example, different filters or conditions may be set by the individual, the entities which obtain the information for and initiate the record at S304 of the first workflow 300, the institutions and entities which are described as including access to the memory or block storage at S308 of the first workflow 300, and any additional entities described herein. In additional and alternative embodiments, different filters or conditions may be set for different types of transactions to different types of information.

When a filter or condition requires authentication or approval by the individual to which the transaction corresponds, an external process of directly or indirectly engaging the individual is performed at S410 of the second workflow 400. As shown in FIG. 4, the external process may be performed externally of the Blockchain, or other memory or block storage. In this regard, an entity which performs the external process may be different than an entity which manages the Blockchain. Thus, a separation of the Blockchain and authorization/access to information contained therein may be provided for. Of course, in further embodiments, a same entity may manage the Blockchain and perform the external process.

In the external process of S410, secondary identification information of the individual to which the transaction corresponds is obtained. The secondary identification information may be the same or similar to the information as described with respect to the primary identification information of the master record and/or the additional identification information included in the attachments to the master record. In certain embodiments, the secondary identification information may even be obtained via the attachments to the master record. In other embodiments, the secondary identification information may be obtained by the entity which performs the external process. In such embodiments, the secondary identification information may be obtained directly from the individual such as, for example, in the embodiments in which the individual contracts with or otherwise causes the entity to perform the external process. In this regard, the secondary identification information may be stored in a different memory, or block storage, than the primary identification information and/or the additional identification information. The secondary identification information may also be managed by an entity that is different than a manager or custodian of the memory or block storage, e.g., the Blockchain, which includes the record of the individual. Such separation of information may decrease the likelihood that the secondary identification information is comprised, thus, reducing the potential for identify theft.

The secondary identification information is used to engage the individual via an external process. Similar to the additional identification information, the secondary identification information may be more dynamic than the primary identification information and more easily changeable. Nevertheless, it is to be known and understood that the nature and/or type of the secondary identification information is not limiting. Any types of information which may be used for directly or indirectly engaging the individual may be included within the secondary identification information.

The external process by which the individual is engaged may be in realtime, near realtime, or otherwise. Specific examples of the external process will be described in the following sections of the present disclosure.

In reply to the external process being completed, the transaction related to the identification information of the individual may be approved at S412 of the second workflow 400. The approval allows the transaction related to the identification information to be executed at S414 of the second workflow 400. That is, upon execution of the transaction, the institution which made the transaction at S402 may be provided access to the confidential information of the record, or the confidential information of the record may be otherwise modified in accordance with the transaction.

The entity which engages the individual with the external process at S410 may be the same or different than the entity which executes the transaction related to the identification information at S414. In any event, the individual is provided with control over both the access to and the management of the identification information stored in the memory or block storage.

Should the external process not be completed, the transaction related to the identification information of the individual may be rejected at S416 of the second workflow 400. Upon rejection, the second workflow 400 may follow-up with the institution which made the transaction at S418, or the transaction and the second workflow may be terminated.

As discussed above, FIG. 2 is a schematic of a system 200, deployed in an exemplary network environment, for approving a transaction related to identification information of an individual. The system 200, or elements thereof, may execute any one or both of the first and second workflows 300, 400, or any portion of any one or both of the first and second workflows 300, 400.

For example, the system 200 includes an information management computing apparatus 202 which may approve/authenticate the transaction related to the identification information of the individual. The information management computing apparatus 202 may be the same or similar to the computer system 102 as described with respect to FIG. 1, including any features or combination of features described with respect thereto.

Figure 5:
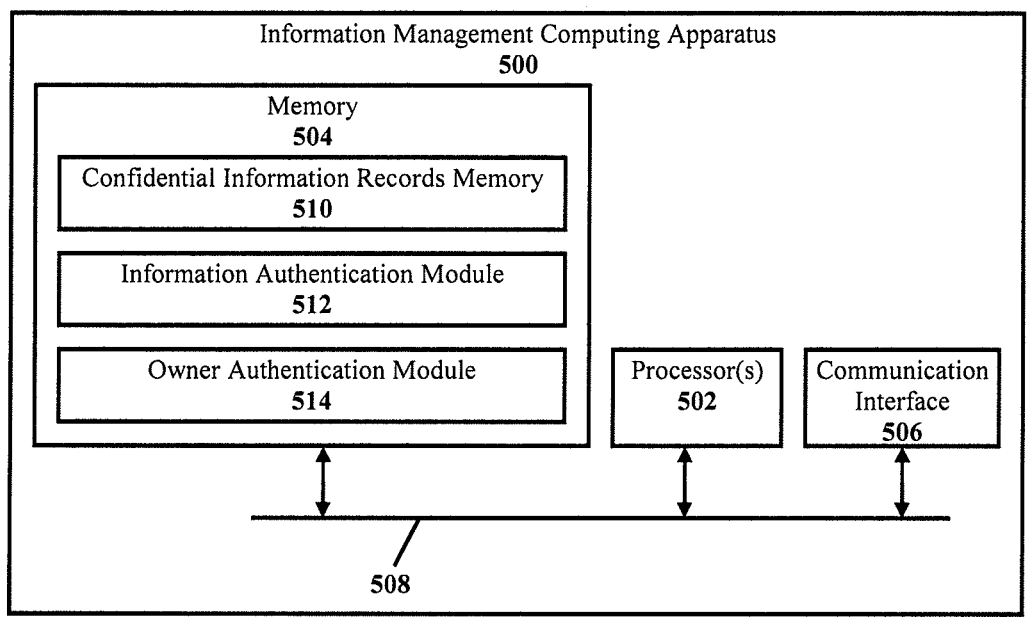
FIG. 5 illustrates an exemplary embodiment of an information management computing apparatus according to an aspect of the present disclosure.

An exemplary information management computing apparatus 202 is shown in FIG. 5 at 500, the information management computing apparatus 500 may include one or more processor(s) 502, a memory 504, and a communication interface 506 which are coupled together by a bus or other communication link 508, although the information management computing apparatus 500 can include other types and/or numbers of elements in other configurations and may comprise one or more networked computing devices. The processor(s) 502 of the information management computing apparatus 500 may execute programmed instructions stored in the memory 504 for any types and/or number of the operations and other functions as described and illustrated herein. The processor(s) 502 of the information management computing apparatus 500 may include one or more CPUs or general purpose processors with one or more processing cores, for example, although other types of processor(s) can also be used.

The memory 504 of the information management computing apparatus 500 may be the same or similar to the computer memory 106 as described with respect to FIG. 1, including any features or combination of features described with respect thereto. The memory 504 may store the programmed instructions for one or more aspects of the present disclosure as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s) 502, can be used for the memory 504.

In this particular example of FIG. 5, the memory 504 of the information management computing apparatus 500 includes a confidential information records memory 510, an information authentication module 512, and an owner authorization module 514, although the memory 504 can include other types and/or numbers of other memories, databases, tables, modules, programmed instructions, applications and/or other data for example. Each of the above-listed memories and modules may be the same or similar to the computer memory 106 as described with respect to FIG. 1, including any features or combination of features described with respect thereto.

The confidential information records memory 510 may be configured to obtain, store, and provide upon request confidential information when authorization is confirmed or approved, although other types and/or amounts of information could be stored and managed. In this regard, the confidential information records memory 510 may be the same or similar to the memory or block storage as described with respect to FIG. 2 and FIG. 3. The stored confidential information may comprise personally identifiable information, such as the above described confidential information.

The information authorization module 512 may comprise programmable instructions for one or more information authentication processes, such as a password entry and confirmation process, a text message confirmation process, or an email confirmation by way of example only, although other types of authentication processes may be used. The information authorization module 512 may be used to complete the external process as described with respect to S410 of the second workflow 400.

The communication interface 506 of the information management computing apparatus 500 operatively couples and communicates between the information management computing apparatus 500 and one or more information transaction computing devices and/or one or more owner computing devices which are all coupled together by the one or more communication network(s), although other types and/or numbers of communication networks or systems with other types and/or numbers of connections and/or configurations to other devices and/or elements can also be used. The one or more information transaction computing device(s) are shown in FIG. 2 at 204, the one or more owner computing device(s) are shown in FIG. 2 at 206, and the one or more communication network(s) are shown in FIG. 2 at 208.

The one or more communication network(s) 208 may be the same or similar to the network 122 as described with respect to FIG. 1, can include LAN(s) or WAN(s), and can use TCP/IP over Ethernet and industry-standard protocols, although other types and/or numbers of protocols and/or communication networks can be used. The communication network(s) 208 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The information transaction computing devices 204 may comprise any type of computing device, and be the same or similar to the computer system 102 or the computer device 120 of FIG. 1, including any features or combination of features described with respect thereto. For example and further, the information transaction computing devices 204 may be the same or similar to the institutions as described with respect to the first and second workflows 300, 400. Indeed, the information transaction computing devices 204 may be at or include a financial institution, a party for a smart contract, or another third party that may be making a proper or improper request or transaction for the identification information of the individual. Any additional or alternative relationship may exist between any or all of the information transaction computing devices 204, information management computing apparatus 202, and owner computing devices 206, or no relationship may exist.

The plurality of owner computing devices 206 may comprise any type of computing device, and be the same or similar to the computer system 102 or the computer device 120 of FIG. 1, including any features or combination of features described with respect thereto. Accordingly, the owner computing devices 206 can be mobile computing devices, desktop computing devices, laptop computing devices, tablet computing devices, virtual machines (including cloud-based computers), or the like, that host chat, e-mail, or voice-to-text applications, for example. While the owner computing devices 206 are described as "owner" devices, it is to be known and understood that they need not necessarily be "owned" by the individual which uses the device.

In the system 200 of FIG. 2, the information management computing apparatus 202 is shown as being connected to a plurality of information transaction computing devices 204 and a plurality of owner computing devices 206 via one or more communication networks 206, although the system 200 could include any number of information transaction computing devices 204, any number of owner computing devices 206, other types and/or numbers of systems, devices, components, and/or other elements. The system 200 provides a number of advantages including, but not limited to, providing in real time improved identity theft protection as will be described below.

Figure 6:
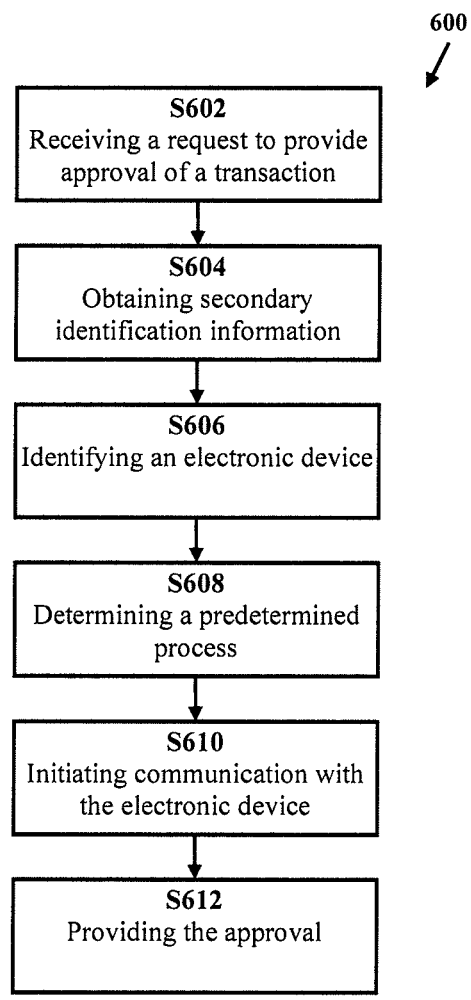
FIG. 6 is a flowchart of an exemplary process for approving a transaction related to identification information of an individual.

An exemplary process for approving a transaction related to identification information of an individual is generally indicated at 600 in FIG. 6. For convenience, the process 600 is described as being performed by the information management computing apparatus 202 of FIG. 2. Although, it is to be known and understood that the process 600 may be performed by any device or combination of devices described herein. The process 600 may further be embodied in any of the device or media described herein.

The information management computing apparatus 202 receives a request to provide approval of the transaction related to the identification information of the individual at S602. The request may be a second transaction, with the transaction related to the identification information being a first transaction. Nevertheless, such second transaction is described herein as a request for clarity. The identification information may include any information as described herein and is stored in a memory such as, for example, a block storage. The identification information may be stored in a record or block of the memory or block storage and may include static or dynamic identification information. The transaction may be to access the identification information, whether stored in a master record or in an attachment to the master record. Additionally or alternatively, the transaction may be to add, modify, delete, change, or otherwise modify the identification information, whether stored in a master record or in an attachment to the master record. The transaction may further additionally or alternatively be to create a smart or other contract.

The request to provide the approval of the transaction may be received from an entity that manages the memory or block storage. Alternatively, the information transaction computing device 204 of FIG. 2 may make the request, and the information management computing apparatus 202 may receive the request from the information transaction computing device 204. In other words, the information management computing apparatus 202 may be the entity that manages the memory or block storage including the identification information. In any event, the request is received after the transaction related to the identification information, and/or the entity making the transaction, is authenticated. That is, prior to the request being received by the information management computing apparatus 202, it may be confirmed that the institution making the transaction has the requisite permission and that the transaction is valid.

Secondary identification information of the individual is obtained at S604, in response to the request being received at S606. The secondary identification information may be automatically retrieved in response to the request being received, or the secondary identification information may be obtained when the transaction and/or the institution making the transaction satisfies a predetermined condition.

The secondary identification information may include any information as described herein and may be stored in a second memory different than the memory in which the identification information is stored. Alternatively, the secondary identification information may be obtained from the identification information to which the transaction relates. The secondary identification information of the individual may include dynamic or static identification information, as described above.

Thereafter, based on the secondary identification information of the individual, an electronic device is identified at S606. The electronic device may be the same or similar to the owner computing devices 206 of FIG. 2. The secondary identification information of the individual may include, for example, an identifier associated with the electronic device. The electronic device may be any computing device which includes a memory and a processor as described herein, or any additional device as described herein.

A predetermined process for approving the transaction related to the identification information may be determined by the information management computing apparatus 202 at S608. The predetermined process may include a condition or conditions based upon which it is determined whether the individual approves or rejects the transaction related to the identification information of the individual.

For example, the predetermined process may include a condition based upon a message which is transmitted to the electronic device identified in S606. Such a condition may be determined to be satisfied when an affirmative reply is received from the electronic device in response to the message. According to such example, the information management computing apparatus 202 may confirm whether the individual approves or rejects the transaction related to the identification information via text, voice, or other message.

The predetermined process may additionally or alternatively include a timeout period. In other words, the predetermined process may be required to be completed before expiration of the timeout period. In this regard, the approval that approves execution of the transaction related to the identification information may be provided in response to the predetermined process being completed before expiration of the timeout period. Should the timeout period lapse without the predetermined process being completed, the information management computing apparatus 202 may reject the transaction. Alternatively, should the timeout period lapse without the predetermined process being completed, the information management computing apparatus 202 could approve the transaction, re-execute the same predetermined process, or execute a different external process.

The predetermined process may even further additionally or alternatively include a condition that the transaction related to the identification information of the individual is not initiated from at least one predetermined region. That is, should the institution making the transaction or the location at which the transaction is made be from such predetermined region, the information management computing apparatus 202 may automatically determine that the predetermined process is not successfully completed with or without intervention of the individual. With intervention, the information management computing apparatus 202 may inform the individual of the location via communication with the electronic device. According to such feature, transactions that originate from predetermined regions, or from institutions of predetermined regions, may be automatically rejected with or without intervention of the individual. As a result, transactions from high risk identify-theft-areas may be simply and easily rejected.

The predetermined process may also include a condition that the individual that corresponds to the transaction related to the identification information is not identified in a data breach. That is, should the individual be part of an identity breach, the information management computing apparatus 202 may automatically determine that the predetermined process is not successfully completed with or without intervention of the individual. With intervention, the information management computing apparatus 202 may inform the individual of the occurrence and/or nature of the data breach. According to such feature, transactions may be prevented when the individual is at highest risk for identity theft. Of course, such a feature may also include a time constraint related to when the data breach occurred and/or the magnitude of the data breach. That is, the data breach may be required to have occurred within a predetermined time period. The predetermined time period may be fixed or variable based on the magnitude of the data breach.

The predetermined process for approving the transaction related to the identification information of the individual may also be determined from a plurality of predetermined processes, and may even include any combination of such plurality of predetermined processes as described herein.

In one embodiment, the information management computing apparatus 202 may determine one of the plurality of predetermined processes based on the institution making the transaction and/or the nature of the transaction. That is, one of the predetermined processes may be determined based upon whether the transaction is to read or modify the identification information, and/or based on whether the transaction relates to the primary identification information in the master record or the additional identification information attached thereto. According to such features, more secure or robust processes may be determined for more significant and potentially consequential transactions.

In the event the information management computing apparatus 202 selects from among a plurality of predetermined processes at S608, a first predetermined process may selected from the plurality of predetermined processes in response to the secondary identification information of the individual being changed within a predetermined time period. In contrast, a second predetermined process may be selected from the plurality of predetermined process in response to the secondary identification information of the individual not being changed within the predetermined time period, with the second predetermined process being different than the first predetermined process. Accordingly, when the secondary identification information of the individual is changed recently, a more secure or robust process may be selected. Additionally or alternatively, a process may be selected which uses more obscure or lesser known secondary identification information or secondary identification information which was not recently updated. Accordingly to such features, the information management computing apparatus 202 may be able to better thwart would be identity stealers that are able to change or update the secondary identification information of the individual with an intent to intercept the request for approval.

In a further example in which the information management computing apparatus 202 selects from among a plurality of predetermined processes at S608, a first predetermined process may be selected from the plurality of predetermined processes in response to the transaction being initiated from at least one predetermined region or the individual being identified in a data breach. Similarly, a second predetermined process may be selected from the plurality of predetermined processes in response to the transaction not being initiated from the at least one predetermined region and the individual not being identified in the data breach, with the second predetermined process being different than the first predetermined process. Accordingly, when the institution making the transaction or the transaction itself is from an at risk region and/or when the individual has been subject to a data breach, a more secure or robust process may be selected. Thus, as generally discussed above, increased identify theft protection may be adopted for risky transactions and when the individual is at increased risk.

When the information management computing apparatus 202 selects from among a plurality of predetermined processes or conditions at S608, plural processes or conditions may further be selected based on relations thereto. For example, a first predetermined process may be selected from the plurality of predetermined processes in response to a first piece of the secondary identification information of the individual corresponding to a second piece of the secondary identification information of the individual. Specifically, the first piece of the secondary identification information of the individual may include an identifier for the electronic device. The second piece of the secondary identification information of the individual may include an address of the individual. The first piece of the secondary identification information may be determined to correspond to the second piece of the secondary identification information in response to a location of the electronic device being within a predetermined distance of the address of the individual. Accordingly, if it is determined that the individual's electronic device, such as a cell phone, is at or near his or her residence, the information management computing apparatus 202 may automatically approve the transaction or select a less robust authorization process. In these examples, if the individual's electronic device is required for or relates to the transaction, it may be presumed that identify theft has not occurred if the individual's electronic device and residence are co-located or closely-located. With respect to the above example, the information management computing apparatus 202 may of course select a second predetermined process from the plurality of predetermined processes in response to the first piece of the secondary identification information of the individual not correlating to the second piece of the secondary identification information of the individual, with the second predetermined process being different than the first predetermined process.

In even further embodiments of the process of FIG. 6 in which the external process obtained at S608 includes a condition, the secondary identification information of the individual may again include an identifier for the electronic device and an address of the individual. A communication with the electronic device, as will be discussed with respect to S610, may include determining a location of the electronic device. That is, the information management computing apparatus 202 may obtain the electronic device's location by accessing, requesting, or otherwise obtaining its positioning information. The predetermined process may include a condition that the location of the electronic device is within a predetermined distance of the address of the individual. In such instance, if the transaction relates to or otherwise requires the electronic device of the individual, the information management computing apparatus 202 may presume that identify theft has not occurred if the individual's electronic device and residence are co-located or closely-located. As a result, the information management computing apparatus 202 may select a less robust authentication process and/or automatically approve the transaction.

Further and similarly to the above described embodiment, the secondary identification information of the individual may include an identifier for the electronic device. The communication with the electronic device, as again will be discussed with respect to S610, may include accessing a camera of the electronic device or obtaining biomedical data from the electronic device. The predetermined process may include a condition that the individual is identified with the camera of the electronic device using a facial recognition process or by matching data in the secondary identification information of the individual with the obtained biometric data. Again, if the transaction relates to or otherwise requires the electronic device of the individual, the information management computing apparatus 202 may presume that identify theft has not occurred if the individual is in possession of the electronic device. As a result, the information management computing apparatus 202 may again select a less robust authentication process and/or automatically approve the transaction.

Upon determining or otherwise selecting the predetermined process, communication is initiated with the electronic device according to the predetermined process at S610. The communication may be initiated with our without intervention of the user according to any of the above-described processes and/or conditions, or in accordance with any additional known or understand processes or conditions. In any event, the communication is initiated with the electronic device such that the individual, or the information management computing apparatus 202, may approve or otherwise reject the transaction regarding the confidential information.

After initiating the communication with the electronic device at S610, the information management computing apparatus 202 may provide the approval for the transaction in response to the predetermined process being completed at S612. Should the predetermined process not be completed, the information management computing apparatus 202 may reject the transaction. The approval approves execution of the transaction related to the identification information. In this regard, the approval may be provided to the entity that initiates the recordation process as described with respect to S406 of the second workflow 400. The entity may thereafter approve the execution of the transaction related to the identification information in response to the approval. In alternative embodiments, the information management computing apparatus 202 may initiate the recordation process as described with respect to S406 of the second workflow 400. That is, the information management computing apparatus 202 may retrieve the identification information from the memory after the transaction related to the identification information is authenticated. Thereafter, upon approval of the transaction at S612, the information management computing apparatus 202 may execute the transaction related to the identification information, on the identification information stored in the memory.

Figure 7:
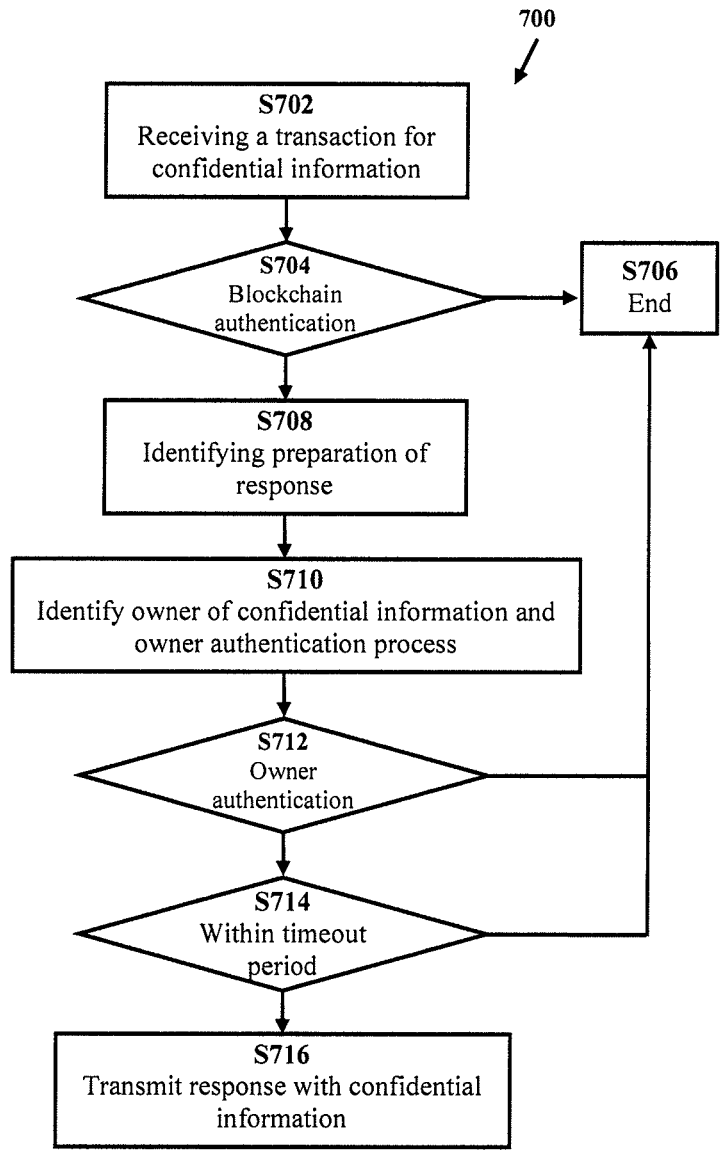
FIG. 7 is a flowchart of an additional exemplary process for approving a transaction related to identification information of an individual.

A further exemplary process for approving a transaction related to identification information of an individual is generally indicated at 700 in FIG. 7. For convenience, the process 700 is described as being performed by the information management computing apparatus 500 of FIG. 5. Although, it is to be known and understood that the process 700 may be performed by any device or combination of devices described herein.

In S702, the information management computing apparatus 500 may receive a request for confidential information from one of the information transaction computing devices 204. By way of example only, the request may be for personally identifiable information relating to a financial matter or may be for confidential information relating to a smart contract, although the confidential information that is requested may relate to a variety of different applications and scenarios. In this example, the confidential information is stored in the confidential information records memory 510 in the memory 504 of the information management computing apparatus 500, although the information may be stored in other locations accessible by the information management computing apparatus 500. Additionally, an information authentication process, such as a password entry and confirmation process by way of example only, may be stored in the information authentication module 512 of the memory 500 of the information management computing apparatus 500. Further, an owner authentication process, such as a text message confirmation mechanism or an email confirmation mechanism by way of example only, may be stored in the owner authentication module 514 of the memory 504 of the information management computing apparatus 500.

By way of example only, a process for creating a Blockchain record with confidential information is illustrated in FIG. 3, although other manners for creating and storing Blockchain records may be used. In this example, an owner of personally identifiable information at one of the owner computing devices 206 may apply for a SSN, TIN, or other personal identifier. The information management computing apparatus 500 may receive a request to initiate the creation of a Blockchain record from a financial institution or other entity at one of the information transaction computing devices 204 which has transacted for personally identifiable information of the owner. The information management computing apparatus 500 creates and stores the Blockchain record with the confidential information which may be accessed for example by multiple institutions, government agencies, or other entities. The information management computing apparatus 500 may also manage the maintenance of each created Blockchain record.

Referring back to FIG. 7, in S704, the information management computing apparatus 500 may determine if the request for the confidential information is authenticated based on a stored information authentication process, such as a stored information authentication process for a financial institution associated with the stored confidential information record or for an entity associated with a smart contract and the stored confidential information record by way of example only. If in S704 the information management computing apparatus 500 determines the request is not authenticated by the information authentication process, then the No branch is taken to S706 where this example of the process 700 may end.

If in S704 the information management computing apparatus 500 determines the request is authenticated by the information authentication process, then the Yes branch may be taken to S708. In S708, the information management computing apparatus 500 may initiate the process for preparing a response to the request with the responsive confidential information, although other types of responses may be generated, such as a response that initiates execution of process in a smart contract with the confidential information.

In S710, the information management computing apparatus 500 may identify the owner of the requested confidential information along with a corresponding stored owner authentication processes, such as a text message confirmation mechanism or an email confirmation mechanism by way of example only, although the owner and/or the corresponding stored owner authentication processes may be identified or obtained in other manners. Next, the information management computing apparatus 500 may initiate the execution of the identified owner authentication mechanism, such as a text message confirmation mechanism or an email confirmation mechanism by way of example only, along with initiating a start of a time period, that is stored in memory 504 of the information management computing apparatus 500, during which the corresponding stored owner authentication process must be successfully completed.

In S712, the information management computing apparatus 500 may determine whether the owner authentication process has been successfully completed. If in S712 the information management computing apparatus 500 determines the owner authentication process has not been successfully completed, then the No branch is taken to S706 where this example of the process 700 may end. The information management computing apparatus 500 may also notify one or more other entities if an unauthorized transaction for confidential information is received to further enhance security.

If in S712 the information management computing apparatus 500 determines the owner authentication process has been successfully completed, then the Yes branch is taken to S714. In S714, the information management computing apparatus 500 may determine whether the owner authentication process was successfully completed within the stored time period. If in S712 the information management computing apparatus determines the owner authentication process was not successfully completed within the stored time period, then the No branch is taken to S706 where this example of the process 700 may end. The information management computing apparatus 500 may also notify one or more other entities if an unauthorized transaction for confidential information is received to further enhance security.

If in S714 the information management computing apparatus 500 determines the owner authentication process was successfully completed within the time period, then the Yes branch is taken to S716. In S716, the information management computing apparatus 500 may proceed with the generated response which by way of example may comprise transmitting requested personally identifiable information to the requesting one of the information transaction computing devices 204 or initiating execution of process in a smart contract with the confidential information.

Accordingly, as illustrated and described by way of the examples herein, this technology provides in real time improved identity theft protection. With this technology, the owner of the confidential information is brought into the process and utilized to capture any fraudulent activity in real time.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for approving a first transaction, the first transaction being related to accessing primary identification information of an individual by an institution, the primary identification information being stored in a memory, the method comprising:

receiving a second transaction to provide approval of the first transaction related to accessing the primary identification information, the second transaction being received after the primary identification information, which is stored in the memory, is authenticated;

obtaining secondary identification information of the individual in response to the second transaction being received, the secondary identification information being stored in a second memory different than the memory in which the primary identification information is stored, the secondary identification information including an identifier for an electronic device;

identifying, based on the secondary identification information of the individual, the electronic device;

selecting, by a processor, a first predetermined process for approving the first transaction related to accessing the primary identification information, the first predetermined process being selected from a plurality of predetermined processes in response to the secondary identification information being changed within a predetermined time period;

initiating communication with the electronic device according to the identifier and accessing a camera of the electronic device during the communication in response to the first predetermined process being selected;

identifying the individual with the camera of the electronic device using a facial recognition process; and providing the approval in response to the first predetermined process being approved, the first predetermined process including a recognition condition that the individual is identified with the camera using the facial recognition process, the approval approving execution of the first transaction related to accessing the primary identification information by the institution, wherein a second predetermined process is selected from the plurality of predetermined process in response to the secondary identification information of the individual not being changed within the predetermined time period, the second predetermined process being different than the first predetermined process, and the institution is allowed access to the primary identification information, and the primary identification information is only changeable through a process with an agency which issues the primary identification information.

2. The method according to claim 1, wherein
the first predetermined process includes a timeout period, and
the approval that approves execution of the first transaction related to accessing the primary identification information is provided in response to the predetermined process being approved before expiration of the timeout period.

3. The method according to claim 1, wherein
the memory, in which the primary identification information is stored, comprises a block storage,
the second transaction to provide the approval of the first transaction related to accessing the primary identification information is received from an entity that manages the block storage,
the approval is provided to the entity, and
the entity executes the first transaction related to accessing the primary identification information in response to the approval.

4. The method according to claim 3, wherein
the primary identification information of the individual is stored in a record of the block storage and includes static identification information, and
the secondary identification information of the individual includes dynamic identification information.

5. The method according to claim 1, wherein
the secondary identification information is obtained from the primary identification information to which the first transaction relates.

6. The method according to claim 5, further comprising:
retrieving the primary identification information from the memory after the first transaction related to accessing the primary identification information is authenticated; and
executing the first transaction related to accessing the primary identification information, on the primary identification information stored in the memory.

7. The method according to claim 1, wherein
the electronic device includes a processor and a memory, and
the predetermined process includes:
transmitting a message to the electronic device during the communication with the electronic device; and
receiving an affirmative reply from the electronic device in response to the message.

8. The method according to claim 1, wherein
the first predetermined process includes a location condition that the first transaction related to accessing the primary identification information of the individual is not initiated from at least one predetermined region.

9. The method according to claim 1, wherein
the first predetermined process includes an identity condition that the individual to which the first transaction relates is not identified in a data breach.

10. The method according to claim 1, wherein
a third predetermined process is selected from the plurality of predetermined processes in response to the first transaction being initiated from at least one predetermined region or the individual being identified in a data breach, and
the second predetermined process is selected from the plurality of predetermined processes in response to the first transaction not being initiated from the at least one predetermined region and the individual not being identified in the data breach, the second predetermined process being different than the third predetermined process.

11. The method according to claim 1, wherein
a third predetermined process is selected from the plurality of predetermined processes in response to a first piece of the secondary identification information of the individual corresponding to a second piece of the secondary identification information of the individual, and
the second predetermined process is selected from the plurality of predetermined processes in response to the first piece of the secondary identification information of the individual not corresponding to the second piece of the secondary identification information of the individual, the second predetermined process being different than the third predetermined process.

12. The method according to claim 11, wherein
the first piece of the secondary identification information of the individual includes the identifier for the electronic device,
the second piece of the secondary identification information of the individual includes an address of the individual, and
the first piece of the secondary identification information is determined to correspond to the second piece of the secondary identification information in response to a location of the electronic device being within a predetermined distance of the address of the individual.

13. The method according to claim 1, wherein
the secondary identification information of the individual includes the identifier for the electronic device and an address of the individual,
the communication with the electronic device includes determining a location of the electronic device, and
the predetermined process includes a location condition that the location of the electronic device is within a predetermined distance of the address of the individual.

14. The method according to claim 1, wherein
the communication with the electronic device includes obtaining biometric data stored by the electronic device, and
the first predetermined process includes a biometric condition that the biometric data stored by the electronic device matches data in the secondary identification information of the individual.

15. The method according to claim 1, wherein
the first predetermined process is automatically rejected without intervention of the individual in response to the communication which is initiated with the electronic device being initiated to a predetermined region.

16. The method according to claim 1, wherein
the second predetermined process is automatically completed in response to the electronic device, with which the communication is initiated, being within a predetermined distance of a location, the location being determined from the secondary identification information of the individual.

17. The method according to claim 1, wherein
in response to the second predetermined process being selected, the communication is initiated with the electronic device without intervention of the individual.

18. The method according to claim 1, wherein
the secondary identification information further includes an address of the individual, and
in response to the first predetermined process being selected, the method further comprises, during the communication with the electronic device:
accessing positioning information of the electronic device; and
determining whether the positioning information of the electronic device is within a predetermined distance of the address of the individual, the first predetermined process further including a location condition that the positioning information is within the predetermined distance of the address.

19. A system for approving a first transaction, the first transaction being related to accessing primary identification information of an individual by an institution, the primary identification information being stored in a first memory, the system comprising:
a processor; and
a second memory storing instructions that, when executed by the processor, cause the processor to perform operations including:
receiving a second transaction to provide approval of the first transaction related to accessing the primary identification information, the second transaction being received after the primary identification information, which is stored in the first memory, is authenticated;
obtaining secondary identification information of the individual in response to the second transaction being received, the secondary identification information being stored in a third memory different than the first memory in which the primary identification information is stored, the secondary identification information including an identifier for an electronic device;
identifying, based on the secondary identification information of the individual, the electronic device;
selecting a first predetermined process for approving the first transaction related to accessing the primary identification information, the first predetermined process being selected from a plurality of predetermined processes in response to the secondary identification information being changed within a predetermined time period;
initiating communication with the electronic device according to the identifier and accessing a camera of the electronic device during the communication in response to the first predetermined process being selected;
identifying the individual with the camera of the electronic device using a facial recognition process;
providing the approval in response to the first predetermined process being approved, the first predetermined process including a recognition condition that the individual is identified with the camera using the facial recognition process, the approval approving execution of the first transaction related to accessing the primary identification information by the institution,
wherein a second predetermined process is selected from the plurality of predetermined process in response to the secondary identification information of the individual not being changed within the predetermined time period, the second predetermined process being different than the first predetermined process, and
the institution is allowed access to the primary identification information, and the primary identification information is only changeable through a process with an agency which issues the primary identification information.

20. A non-transitory computer-readable medium including an executable computer program for approving a first transaction, the first transaction being related to accessing primary identification information of an individual by an institution, the primary identification information being stored in a memory, the executable computer program, when executed by a processor, causing the processor to perform operations comprising:
receiving a second transaction to provide approval of the first transaction related to accessing the primary identification information, the second transaction being received after the primary identification information, which is stored in the memory, is authenticated;
obtaining secondary identification information of the individual in response to the second transaction being received, the secondary identification information being stored in a second memory different than the memory in which the primary identification information is stored, the secondary identification information including an identifier for an electronic device;
identifying, based on the secondary identification information of the individual, the electronic device;
selecting a first predetermined process for approving the first transaction related to accessing the primary identification information, the first predetermined process being selected from a plurality of predetermined processes in response to the secondary identification information being changed within a predetermined time period;
initiating communication with the electronic device according to the identifier and accessing a camera of the electronic device during the communication in response to the first predetermined process being selected;
identifying the individual with the camera of the electronic device using a facial recognition process; and
providing the approval in response to the first predetermined process being approved, the first predetermined process including a recognition condition that the individual is identified with the camera using the facial recognition process, the approval approving execution of the first transaction related to accessing the primary identification information by the institution, wherein a second predetermined process is selected from the plurality of predetermined process in response to the secondary identification information of the individual not being changed within the predetermined time period, the second predetermined process being different than the first predetermined process, and the institution is allowed access to the primary identification information, and the primary identification information is only changeable through a process with an agency which issues the primary identification information.

* * * * *